(12) United States Patent
Ishii

(10) Patent No.: US 9,872,001 B2
(45) Date of Patent: Jan. 16, 2018

(54) PROJECTOR

(71) Applicant: Seiko Epson Corporation, Tokyo (JP)

(72) Inventor: Nobuyuki Ishii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 29 days.

(21) Appl. No.: 15/093,512

(22) Filed: Apr. 7, 2016

(65) Prior Publication Data

US 2016/0301901 A1 Oct. 13, 2016

(30) Foreign Application Priority Data

Apr. 8, 2015 (JP) .................. 2015-079016

(51) Int. Cl.
*F28F 7/00* (2006.01)
*H04N 9/31* (2006.01)

(52) U.S. Cl.
CPC ................. *H04N 9/3144* (2013.01)

(58) Field of Classification Search
CPC .. H04N 9/3144; H04N 9/3105; H04N 9/3138; H04N 13/0239; G03B 21/145; G03B 21/28; G03B 21/16; G03B 7/008; G03B 26/008
USPC ........................................ 165/80.4
See application file for complete search history.

(56) References Cited

U.S. PATENT DOCUMENTS

| 6,356,700 | B1 * | 3/2002 | Strobl | ................. G02B 6/0006 359/859 |
| 2002/0197158 | A1 * | 12/2002 | Hsu | ....................... F04D 29/545 416/5 |
| 2005/0220156 | A1 * | 10/2005 | Kitabayashi | ...... G02F 1/133385 372/35 |
| 2006/0203206 | A1 * | 9/2006 | Kim | ....................... G03B 21/16 353/58 |
| 2008/0055563 | A1 | 3/2008 | Momose et al. | |
| 2012/0013854 | A1 | 1/2012 | Nishimura et al. | |
| 2012/0075599 | A1 * | 3/2012 | Park | ....................... G03B 21/14 353/121 |

FOREIGN PATENT DOCUMENTS

| JP | 2008-58626 A | 3/2008 |
| JP | 2009-86197 A | 4/2009 |
| WO | WO-2010-116444 A | 10/2010 |

* cited by examiner

*Primary Examiner* — Davis Hwu
(74) *Attorney, Agent, or Firm* — ALG Intellectual Property, LLC

(57) ABSTRACT

A projector includes a first cooling object and a second cooling object, a first circulatory cooling device having a first closed housing, and adapted to circulate a first cooling gas in the first closed housing to cool the first cooling object disposed in the first closed housing, and a second circulatory cooling device having a second closed housing, and adapted to circulate a second cooling gas in the second closed housing to cool the second cooling object disposed in the second closed housing, the first cooling object is an image forming section including a light modulation device adapted to modulate light entering the light modulation device to form an image, and the second cooling object is a first optical component included in an optical component making a contribution to the formation of the image by the light modulation device.

6 Claims, 11 Drawing Sheets

PROJECTOR

BACKGROUND

1. Technical Field

The present invention relates to a projector.

2. Related Art

In the past, there has been known a projector provided with a light source device, a light modulation device for modulating the light emitted from the light source device to thereby form an image corresponding to image information, and a projection optical device for projecting the image thus formed on a target projection surface such as a screen in an enlarged manner. As such a projector, there has been proposed a configuration provided with a cooling device for cooling an optical device (including liquid crystal panels as light modulation devices) and a polarization conversion element using the air circulating in an exterior housing (see, e.g., JP-A-2009-86197 (Document 1)).

The projector described in Document 1 is provided with two sirocco fans and a duct. The cooling air fed from each of the two sirocco fans is divided by the duct, and then supplied to each of cooling objects (the optical device and the polarization conversion elements).

Incidentally, in the projector described in Document 1, since the plurality of cooling objects (e.g., the optical device and the polarization conversion elements) is not disposed in an closed space, if the projector is used in a dusty environment, there is a possibility that the dust adheres to the optical device and so on to show a shadow in the projected image, and thus the image is deteriorated. To deal with the above, in order to inhibit the dust from adhering to the optical device and so on, it is possible to keep the plurality of cooling objects in a closed housing, and then circulate the cooling air in the closed housing to thereby cool the plurality of cooling objects.

However, in the case in which the plurality of (e.g., two) cooling objects is kept in the closed housing, there is a problem that the device grows in size due to a heat absorber for absorbing the heat of the cooling air circulating in the closed housing, and in order to release the heat from the heat absorber to the outside of the closed housing. Further, there is a problem that it is difficult to control each of the cooling objects at an appropriate temperature.

SUMMARY

An advantage of some aspects of the invention is to provide a projector, which can be miniaturized.

A projector according to an aspect of the invention includes a first cooling object and a second cooling object, a first circulatory cooling device having a first closed housing, and adapted to circulate a first cooling gas in the first closed housing to cool the first cooling object disposed in the first closed housing, and a second circulatory cooling device having a second closed housing, and adapted to circulate a second cooling gas in the second closed housing to cool the second cooling object disposed in the second closed housing, the first cooling object is an image forming section including a light modulation device adapted to modulate light entering the light modulation device to form an image, and the second cooling object is a first optical component included in an optical component making a contribution to the formation of the image by the light modulation device.

According to the aspect of the invention, since the first cooling object and the second cooling object are respectively cooled by the first circulatory cooling device and the second circulatory cooling device separated from each other, it is possible to appropriately cool each of the first cooling object and the second cooling object, and control the first cooling object and the second cooling object at an appropriate temperature.

Here, in the case in which the first cooling object and the second cooling object are respectively disposed at positions distant from each other, if the first and second cooling objects are cooled with a single circulatory cooling device, the circulatory cooling device grows in size. In contrast, according to this aspect of invention, the first circulatory cooling device and the second circulatory cooling device can be downsized compared to the case of cooling the first cooling object (the image forming section) and the second cooling object with the single circulatory cooling device. Further, by separately disposing the first circulatory cooling device and the second circulatory cooling device, the freedom of arrangement of the first circulatory cooling device and the second circulatory cooling device in the projector is enhanced. Therefore, the projector can be downsized.

In the aspect of the invention described above, it is preferable that the first optical component is a polarization conversion element.

According to the aspect of the invention with this configuration, the polarization conversion element can individually be cooled by the second circulatory cooling device. Thus, the temperature of each of the image forming section and the polarization conversion element can appropriately be controlled.

In the aspect of the invention described above, it is preferable that the first optical component is a wavelength conversion element to be excited by excitation light entering the wavelength conversion element and adapted to emit fluorescent light.

According to the aspect of the invention with this configuration, the wavelength conversion element can individually be cooled by the second circulatory cooling device. Thus, the temperature of each of the image forming section and the wavelength conversion element can be controlled at more appropriate temperature.

In the aspect of the invention described above, it is preferable that the first closed housing and the second closed housing are separated by a division wall, and the division wall is constituted by an optical component housing adapted to hold the optical component, and a second optical component included in the optical component.

According to the aspect of the invention with this configuration, since the division wall is constituted by the optical component housing, and the second optical component, the number of parts can be reduced, and at the same time, downsizing can be achieved compared to the case of constituting the first closed housing and the second closed housing only by other parts. Further, since the first closed housing and the second closed housing are separated from each other by the optical component housing and the second optical component, it is possible to surely cool the first cooling object and the second cooling object, and at the same time control the first cooling object and the second cooling object at an appropriate temperature.

In the aspect of the invention described above, it is preferable that the second optical component includes a reflecting member adapted to reflect light entering the second optical component.

It should be noted that as the reflecting member described above, there can be cited a dichroic mirror and so on besides a total reflection mirror. According to the aspect of the invention with this configuration, since the reflecting member constitutes apart of the division wall, the first closed housing and the second closed housing can surely be constituted by the reflecting member.

In the aspect of the invention described above, it is preferable that the second optical component includes a lens.

According to the aspect of the invention with this configuration, since the lens constitutes a part of the division wall, the first closed housing and the second closed housing can surely be constituted by the lens.

In the aspect of the invention described above, it is preferable that the first circulatory cooling device includes a first circulation fan adapted to circulate the first cooling gas in the first closed housing, and a first cooler adapted to cool the first cooling gas circulated, and the second circulatory cooling device includes a second circulation fan adapted to circulate the second cooling gas in the second closed housing, and a second cooler adapted to cool the second cooling gas circulated.

It should be noted that as the cooler described above, there can be cited a heat exchanger, a heat absorber, and so on.

In the aspect of the invention described above with this configuration, the first cooling gas and the second cooling gas circulating in the first closed housing and the second closed housing can be cooled by the first heat absorber and the second heat absorber, respectively. Therefore, the first cooling object and the second cooling object can surely be cooled by the first cooling gas and the second cooling gas, respectively.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will hereinafter be described with reference to the accompanying drawings.

Appearance Configuration of Projector

Figure 1:
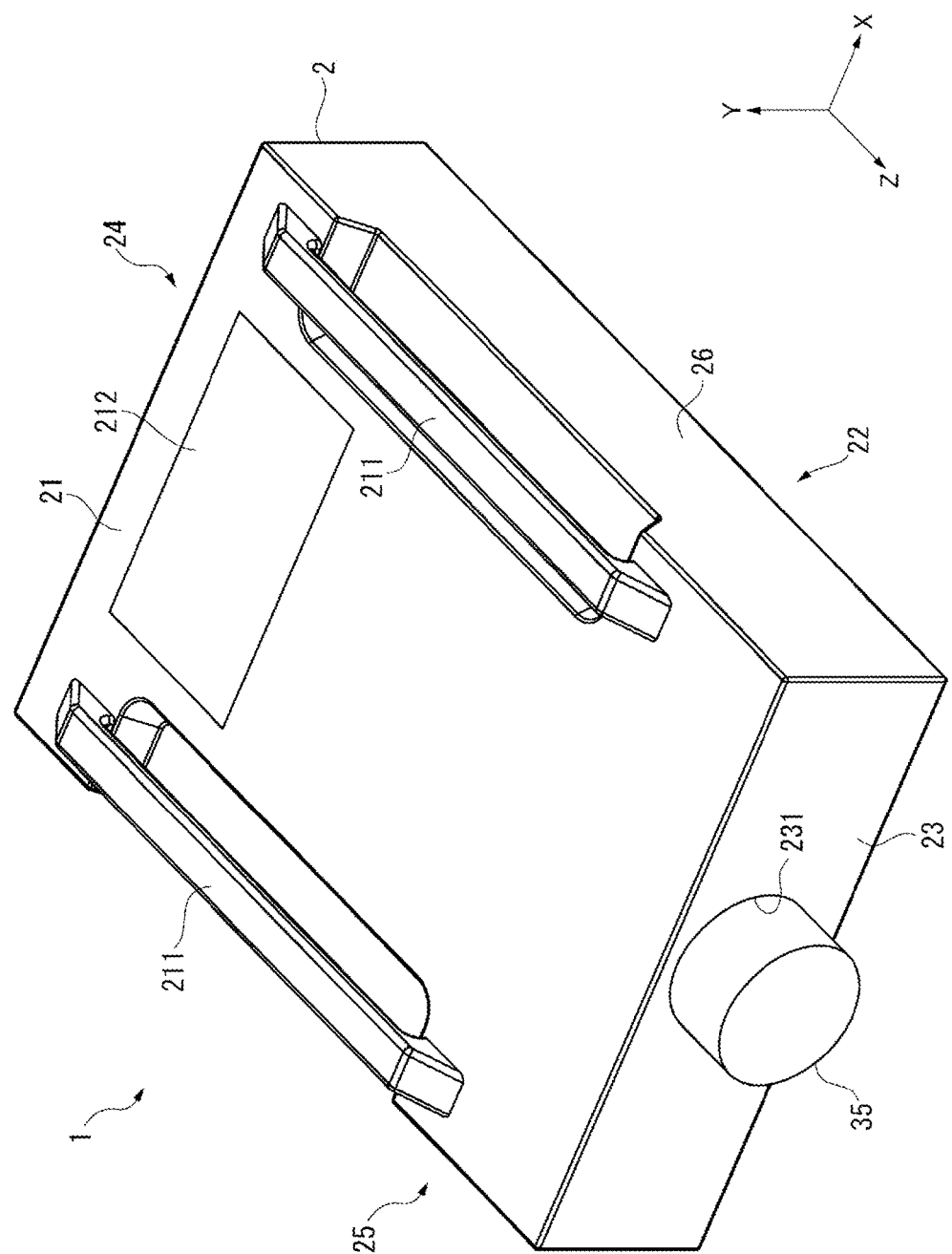
FIG. 1 is a schematic perspective view showing a projector according to a first embodiment of the invention.

FIG. 1 is a schematic perspective view showing a projector 1 according to the present embodiment of the invention.

The projector 1 according to the present embodiment is a projection display device for modulating the light emitted from an illumination device 31 described later to thereby form an image corresponding to image information, and then projecting the image on a projection target surface such as a screen in an enlarged manner.

Although described later in detail, the projector 1 is provided with a first cooling object and a second cooling object each disposed inside a closed housing, and has a function of circulating cooling air (a cooling gas) to cool the first and second cooling objects.

As shown in FIG. 1, the projector 1 is provided with an exterior housing 2 constituting the exterior of the projector 1.

The exterior housing 2 is formed to have a roughly rectangular solid shape having a top surface section 21, a bottom surface section 22, a front surface section 23, a back surface section 24, and side surface sections 25, 26 located on the right and left sides.

The top surface section 21 is provided with a pair of grips 211 used when the user grips the projector 1, or when fixing the projector 1 to the equipment installed on the ceiling or the like. The top surface section 21 is provided with opening sections (not shown) for housing light source devices 31A, 31B described later inside the exterior housing 2 in an exchangeable manner, and the opening sections are covered with a cover member 212.

Although not shown in the drawings, the bottom surface section 22 is provided with a leg section having contact with an installation surface of an installation stand or the like when the projector 1 is installed on the installation surface.

The front surface section 23 is provided with an opening section 231 from which a part of a projection optical device 35 constituting an image forming device 3 described later is exposed.

Although not shown in the drawings, besides the above, the side surface section 26 located on the right side is provided with an inlet for introducing an air located in the outside of the exterior housing 2 to the inside, and the side surface section 25 located on the left side is provided with an outlet for discharging the air located in the inside of the exterior housing 2 to the outside.

It should be noted that in the following drawings and description, the Z direction represents the proceeding direction (the projection direction) of the light projected from the projection optical device 35, and the X direction and the Y direction represent directions perpendicular to the Z direction, and perpendicular to each other. Among these directions, the Y direction represents an upward direction (i.e., a direction from the bottom surface section 22 of the exterior housing 2 toward the top surface section 21) opposite to the vertically downward direction in the case in which the projector 1 is disposed so that the Z direction is parallel to the horizontal direction in a planar view, and the X direction represents a direction from the left side toward the right side viewed from the Z-direction side (the light proceeding-direction side).

Internal Configuration of Projector

Figure 2:
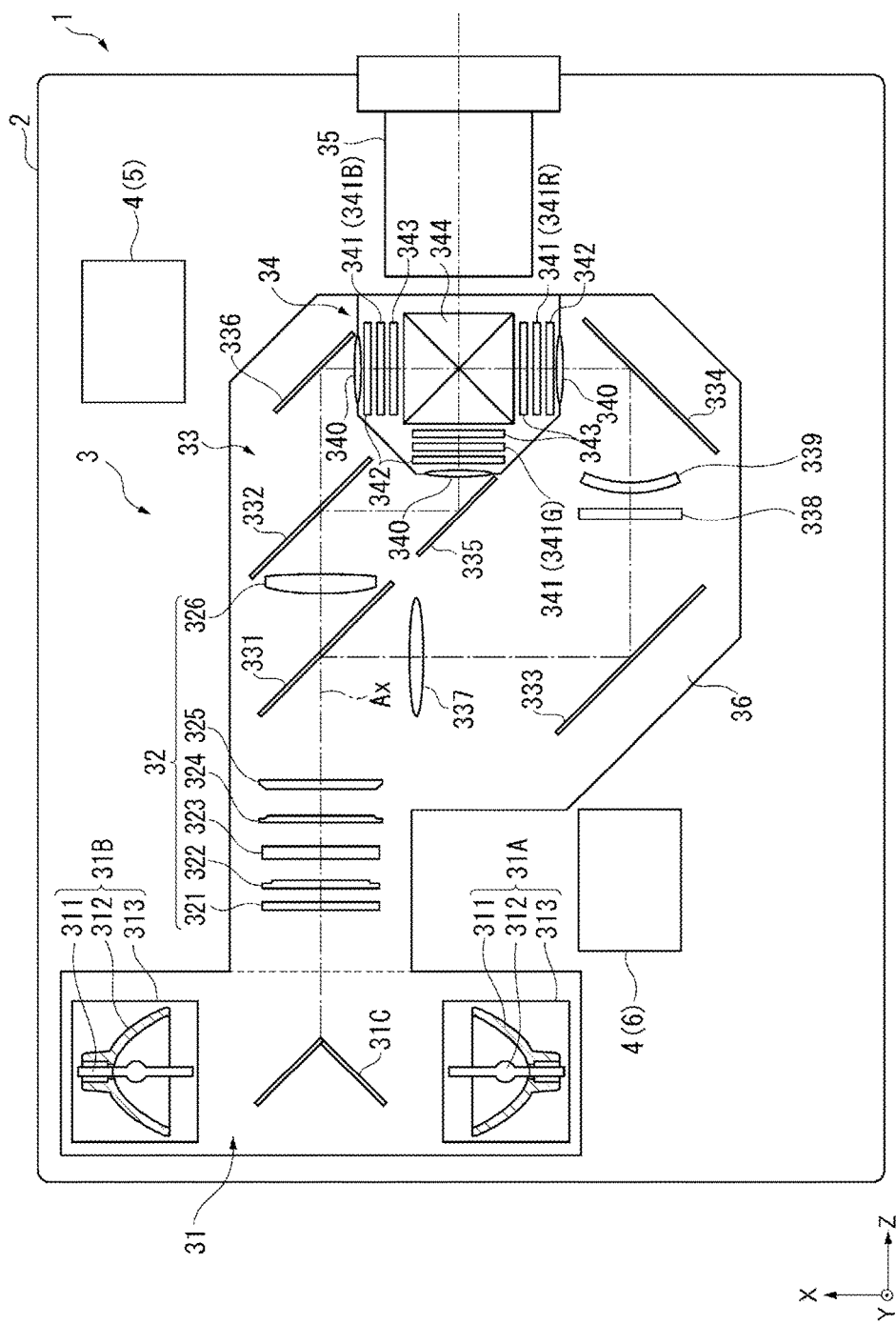
FIG. 2 is a schematic diagram showing an internal configuration of the projector according to the first embodiment.

FIG. 2 is a schematic diagram showing an internal configuration of the projector 1.

As shown in FIG. 2, the projector 1 is provided with the image forming device 3 and a cooling device 4 disposed inside the exterior housing 2 besides the exterior housing 2 described above. Besides the above, although not shown in the drawings, the projector 1 is provided with a control device for controlling the projector 1, and a power supply device for supplying electronic components constituting the projector 1 with electrical power.

Configuration of Image Forming Device

The image forming device 3 forms and then projects the image corresponding to the image information input from the control device described above. The image forming device 3 is provided with an illumination device 31, a homogenization device 32, a color separation device 33, an electro-optic device 34, a projection optical device 35, and an optical component housing 36.

Among these constituents, the optical component housing 36 is a box-like housing having the illumination optical axis Ax set inside, and the illumination device 31, the homogenization device 32, and the color separation device 33 are disposed at respective positions on the illumination optical axis Ax in the inside of the optical component housing 36. Further, the electro-optic device 34 and the projection optical device 35 are located outside the optical component housing 36, but are disposed in accordance with the illumination optical axis Ax. It should be noted that the detailed configuration of the optical component housing 36 will be described later.

The illumination device 31 is provided with a pair of light source devices 31A, 31B disposed so as to be opposed to each other, and a reflecting mirror 31C disposed between the pair of light source devices 31A, 31B.

The pair of light source devices 31A, 31B are each provided with a light source lamp 311, a reflector 312, and a housing body 313 for housing the light source lamp 311 and the reflector 312 inside the housing body 313. Further, these light source devices 31A, 31B emit light toward the reflecting mirror 31C.

The reflecting mirror 31C reflects the light beams input from the respective light source devices 31A, 31B toward the same direction, and thus, makes the light beams enter the homogenization device 32.

The homogenization device 32 homogenizes the illuminance in a plane perpendicular to the central axis of the light beam emitted from the illumination device 31. The homogenization device 32 has a cinema filter 321, a first lens array 322, a UV filter 323, a second lens array 324, a polarization conversion element 325, and an overlapping lens 326.

Among these constituents, the polarization conversion element 325 is for uniforming the polarization direction of the light having entered the polarization conversion element 325 into one type, and corresponds to a polarization conversion section according to the invention.

The color separation device 33 separates the light beam input from the homogenization device 32 into three colored light beams of red (R), green (G), and blue (B). The color separation device 33 has dichroic mirrors 331, 332, reflecting mirrors 333 through 336, and relay lenses 337 through 339.

The electro-optic device 34 modulates each of the colored light beams, which have been separated into, in accordance with the image information, and then combines the colored light beams, which have been modulated, with each other. The electro-optic device 34 has field lenses 340, liquid crystal panels 341 (the liquid crystal panels for red, green, and blue are denoted by 341R, 341G, and 341B, respectively) as light modulation devices, entrance side polarization plates 342, and exit side polarization plates 343 disposed for the respective colored light beams, and one color combining device 344. Among these constituents, as the color combining device 344, there can be adopted a dichroic prism. It should be noted that the electro-optic device 34 corresponds to an image forming section according to the invention.

The projection optical device 35 is a projection lens for projecting the light beam (the light beam for forming an image) combined by the color combining device 344 on the projection target surface in an enlarged manner. As such a projection optical device 35, there can be adopted a combination lens having a plurality of lenses arranged in a lens tube.

Configuration of Cooling Device

The projector 1 is provided with the cooling device 4 disposed inside the exterior housing 2 besides the constituents described above. As shown in FIG. 2, the cooling device 4 is provided with a first circulatory cooling device 5 having the first cooling object (e.g., the electro-optic device 34) disposed inside a closed housing and for circulating the cooling air to the first cooling object to thereby cool the first cooling object, and a second circulatory cooling device 6 having the second cooling object (e.g., the polarization conversion element 325) disposed inside a closed housing and for circulating the cooling air to the second cooling object to thereby cool the second cooling object. Therefore, the first cooling object and the second cooling object are individually cooled by the circulatory cooling devices 5, 6, respectively.

Configuration of First Circulatory Cooling Device

Figure 3:
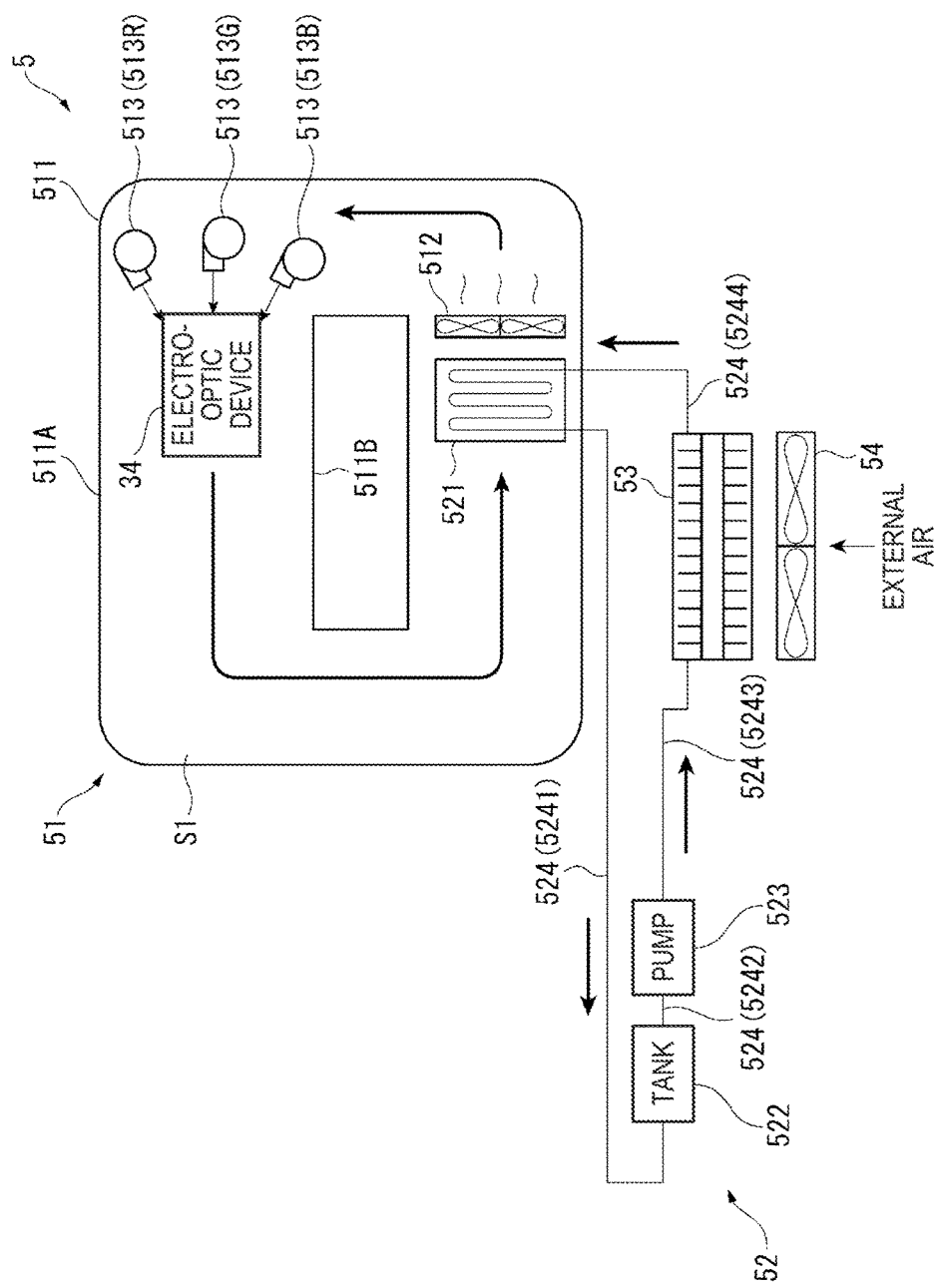
FIG. 3 is a block diagram of a first circulatory cooling device of the projector according to the first embodiment.

FIG. 3 is a block diagram showing a schematic configuration of the first circulatory cooling device 5.

The first circulatory cooling device 5 is for circulating the cooling air located inside the closed space S1 formed by a first closed housing 511 to distribute the cooling air to thereby cool the first cooling object disposed inside the closed space S1, then conducting the heat of the first cooling air having been used for cooling the first cooling object to a first liquid circulating through a circulation flow path to release the heat to the outside of the first closed housing 511, and then conducting the heat from the first liquid to a second liquid circulating through another circulation flow path to thereby release the heat. It should be noted that the first liquid and the second liquid are designations representing the fact that the liquids circulate in the different circulation flow paths, and can be liquids the same in component as each other. As such liquids, there can be cited water and an antifreeze solution such as propylene glycol.

As shown in FIG. 3, the first circulatory cooling device 5 is provided with a cooling device 51, a heat absorbing device 52, a heat radiation device 53, and a cooling fan 54.

Configuration of Cooling Device

The cooling device 51 is a circulatory cooling device for circulating the first cooling air located inside the first closed housing 511 to cool the first cooling object described above disposed inside the first closed housing 511. The cooling device 51 is provided with circulation fans 512 and cooling fans 513 besides the first closed housing 511.

The first closed housing 511 is a housing in which the electro-optic device 34 as the cooling object, the circulation fans 512, the cooling fans 513, and a heat absorber 521 constituting the heat absorbing device 52 described later are housed, and forms the closed space S1 in which these constituents are disposed. The first closed housing 511 is configured as a closed structure difficult for the air located outside the first closed housing 511 to flow into the inside of the closed housing 511.

The first closed housing 511 has an outer wall section 511A constituting an outer edge of the first closed housing 511, and an inner wall section 511B constituting an inner surface, and a part of the outer wall section 511A and the inner wall section 511B is formed of an outer surface section 367 (see FIG. 7) as a part of the optical component housing 36. By the outer wall section 511A and the inner wall section 511B combined with each other, a circulation flow path having an annular shape is formed inside the first closed housing 511. On the circulation flow path, there is disposed the first cooling object (the electro-optic device 34).

The circulation fans 512 each correspond to a first circulation fan according to the invention, and suction and then eject the cooling air located inside the first closed housing 511 to thereby circulate the cooling air inside the first closed housing 511. The circulation fans 512 are each formed of an axial fan in the present embodiment, and there are disposed two circulation fans in the vicinity of the heat absorber 521 described later. However, besides this configuration, it is possible for the circulation fan 512 to be formed of a sirocco fan, and the number of the circulation fans 512 can arbitrarily be changed, and further, the circulation fans 512 can be arranged in a dispersed manner.

The cooling fans 513 each suction the cooling air located inside the first closed housing 511, and then feed the cooling air to the first cooling object via ducts (not shown). The cooling fans 513 include cooling fans 513R, 513G, and 513B disposed so as to correspond to the respective liquid crystal panels 341 of the electro-optic device 34 described above to feed the cooling air to the respective liquid crystal panels 341. Such cooling fans 513 are each formed of a sirocco fan in the present embodiment, but can also be formed of an axial fan, and the number of the cooling fans 513 can arbitrarily be changed.

Configuration of Heat Absorbing Device

The heat absorbing device 52 is for absorbing the heat from the cooling air located inside the first closed housing 511 described above, and circulating the first liquid, to which the heat has been conducted, to the heat radiation device 53 located outside the first closed housing 511. The heat absorbing device 52 has a heat absorber 521, a tank 522, a pump 523, and a plurality of circulation pipes 524. It should be noted that the heat absorber 521 corresponds to a first cooler according to the invention.

Among these constituents, the circulation pipes 524 (5241 through 5244) connect the heat absorber 521, the tank 522, and the pump 523, to the heat radiation device 53 described later so that the first liquid can circulate the inside.

The heat absorber 521 corresponds to the first cooler according to the invention, and is disposed in the first closed housing 511 described above, and the tank 522 and the pump 523 are disposed outside the first closed housing 511.

Among these constituents, the heat absorber 521 is connected to the tank 522 via the circulation pipe 5241, and is also connected to the heat radiation device 53 via the circulation pipe 5244. The heat absorber 521 absorbs the heat from the cooling air circulating inside the first closed housing 511 to cool the cooling air, and then conducts the heat thus absorbed to the first liquid circulating inside the heat absorber 521. The first liquid having been heated by the heat absorber 521 circulates toward the tank 522 via the circulation pipe 5241.

The tank 522 is connected to the pump 523 via the circulation pipe 5242. The tank 522 temporarily stores the first liquid circulating via the circulation pipes 5241 through 5244. Thus, the first liquid mixed with air or an impurity is inhibited from flowing into the pump 523.

The pump 523 pressure-feeds the first liquid having flowed through the circulation pipe 5242 to the heat radiation device 53 via the circulation pipe 5243.

Configuration of Heat Radiation Device and Cooling Fan

Further, the first liquid having circulated to the heat radiation device 53 is cooled by the cooling air circulated to the heat radiation device 53 from the cooling fan 54, and then circulates again to the heat absorber 521 via the circulation pipe 5244. Thus, the first liquid low in temperature circulates through the heat absorber 521, and the first liquid provided with the heat, which has been absorbed from the cooling air inside the first closed housing 511 by the heat absorber 521, flows from the heat absorber 521 into the tank 522 via the circulation pipe 5241. In such a manner, in the heat absorbing device 52, the first liquid is circulated by driving the pump 523.

In such a manner, in the first circulatory cooling device 5, the electro-optic device 34 as the first cooling object described above is cooled in the circulation flow path while the cooling air is cooled by the heat absorber 521.

Configuration of Second Circulatory Cooling Device

Figure 4:
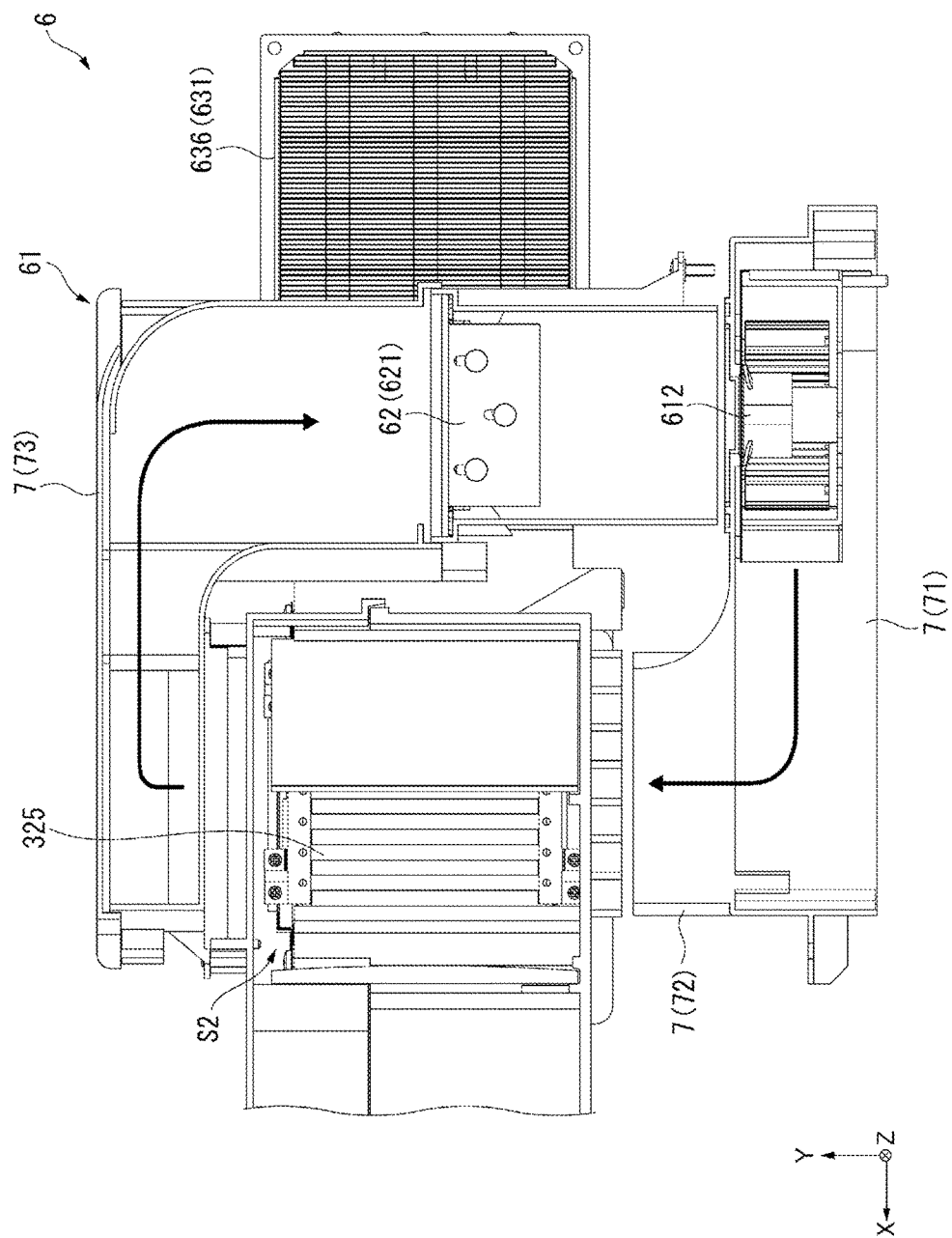
FIG. 4 is a cross-sectional view showing a flow path of a second circulatory cooling device of the projector according to the first embodiment.

FIG. 4 is a cross-sectional view showing the second circulatory cooling device 6 and a flow path of the cooling air circulating through the second circulatory cooling device 6.

The second circulatory cooling device 6 is for circulating the cooling air located inside the closed space S2 formed by a second closed housing 7 to distribute the cooling air to thereby cool the second cooling object (e.g., the polarization conversion element 325) disposed in the closed space S2, then conducting the heat of the second cooling air having been used for cooling the second cooling object to a third liquid circulating to a heat pipe 622 (see FIG. 5) to release the heat to the outside of the second closed housing 7, and then cooling the third liquid located in the heat pipe 622 by the cooling air fed from the cooling fan (not shown) to a heatsink 631 connected to the heat pipe 622, and thus releasing the heat described above. It should be noted that third liquid can also be a liquid having the same component. As such a liquid, there can be cited water and an antifreeze solution such as propylene glycol.

As shown in FIG. 4, the second circulatory cooling device 6 is provided with a cooling device 61, a heat absorbing device 62, a heat radiation device 63, and a cooling fan (not shown).

Configuration of Cooling Device

Figure 5:
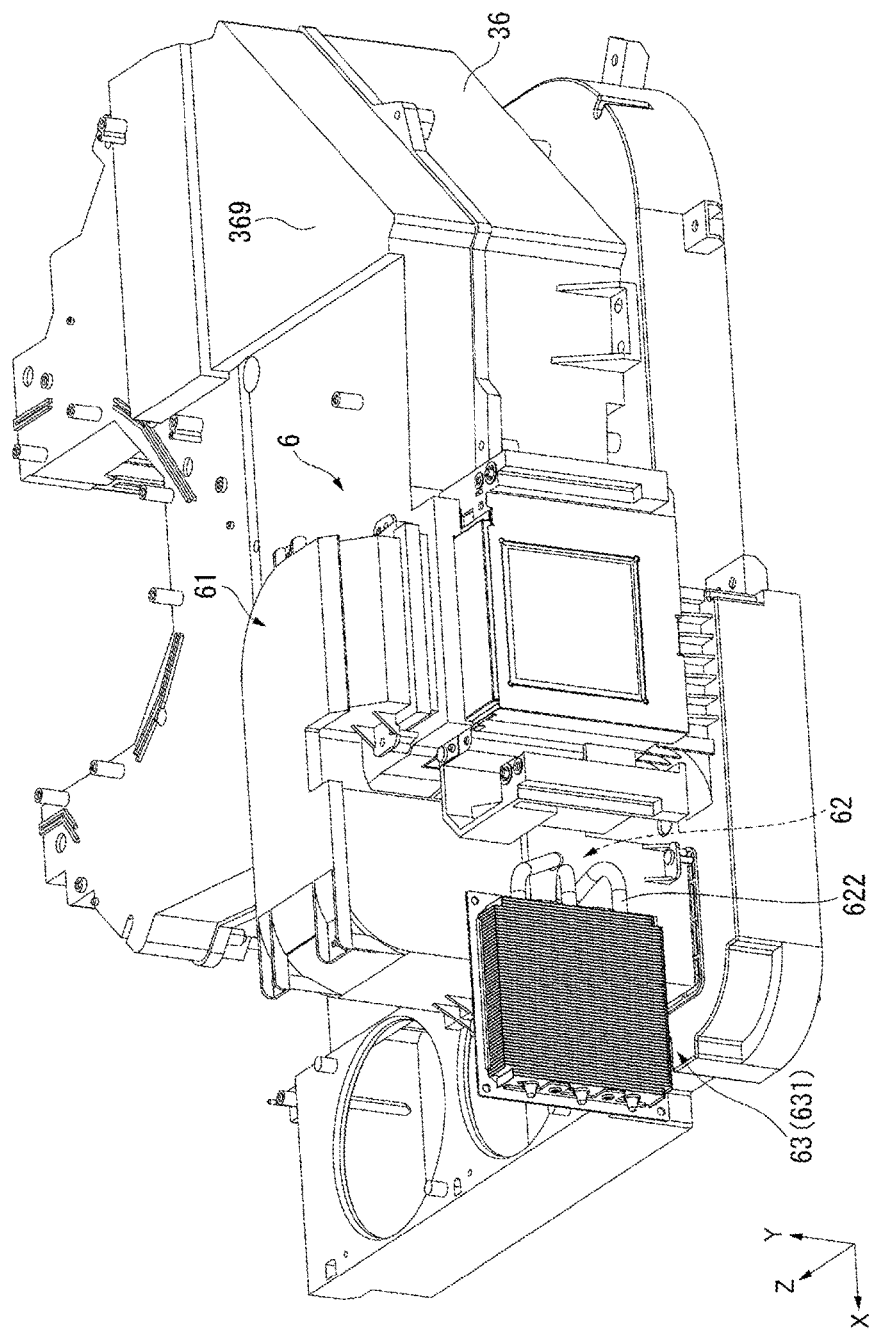
FIG. 5 is a perspective view of the second circulatory cooling device and an optical component housing of the projector according to the first embodiment viewed from an opposite side to a light emission direction.
Figure 6:
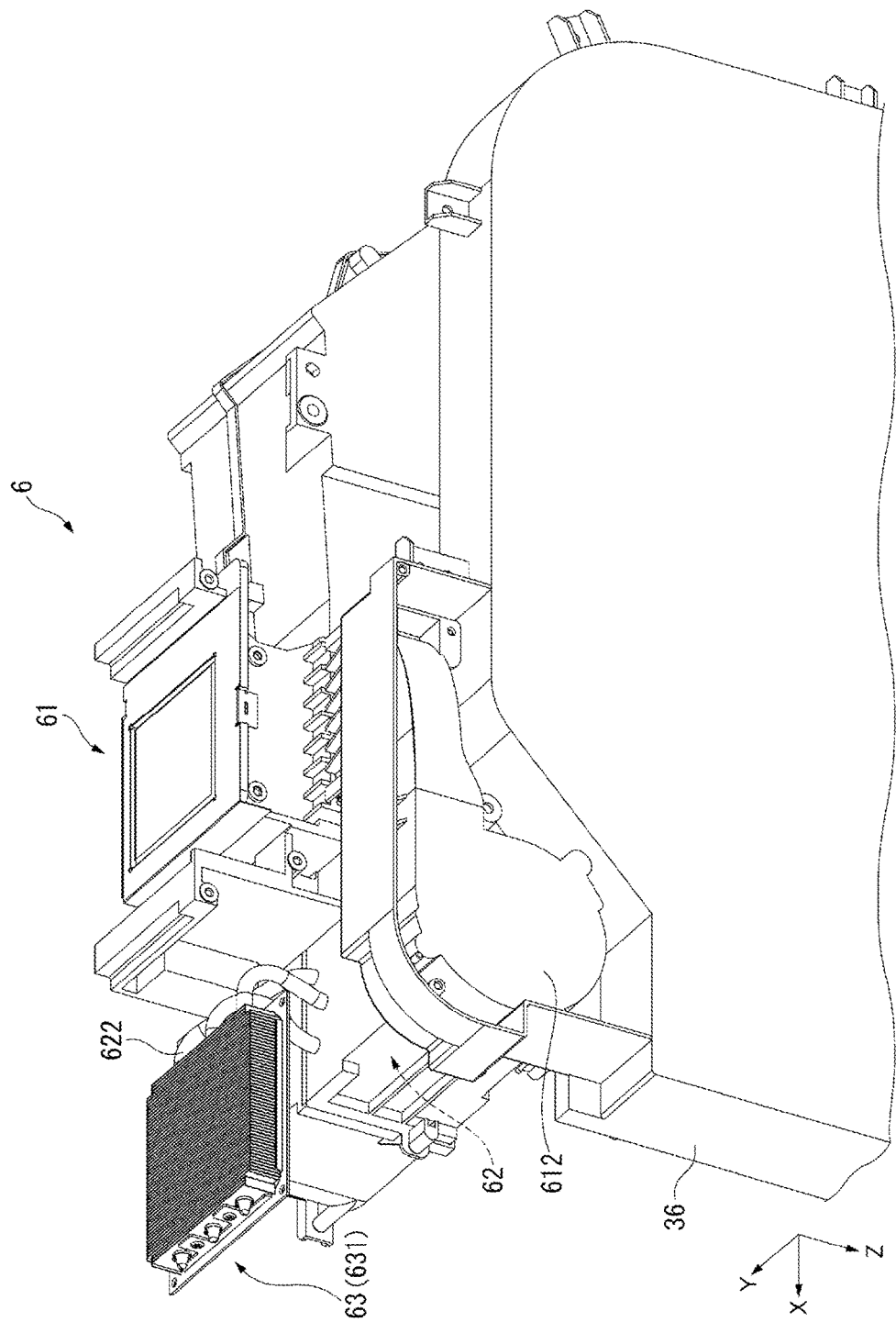
FIG. 6 is a perspective view of the second circulatory cooling device and the optical component housing of the projector according to the first embodiment viewed from a direction different from the direction in FIG. 5.

FIG. 5 is a perspective view of the optical component housing 36 and the second circulatory cooling device 6 viewed from an opposite-direction side to the Z direction, and FIG. 6 is a perspective view of the optical component housing 36 and the second circulatory cooling device 6 viewed from an opposite-direction side to the Y direction.

The cooling device 61 is a circulatory cooling device for circulating the second cooling air located inside the second closed housing 7 to cool the second cooling object described above disposed inside the second closed housing 7. In FIGS. 5 and 6, the cooling device 61 is provided with a circulation fan 612 in addition to a plurality of ducts 71 through 73 constituting the second closed housing 7.

The second closed housing 7 is a housing in which the polarization conversion element 325 as the cooling object, the circulation fan 612, and the heat absorber 621 constituting the heat absorbing device 62 described later are housed, and forms the closed space S2 in which these constituents are disposed. The second closed housing 7 is configured as a closed structure difficult for the air located outside the second closed housing 7 to flow in the inside of the second closed housing 7.

The second closed housing 7 is constituted by the first duct 71, the second duct 72, the third duct 73, and a part of the optical component housing 36. Although described later in detail, a part of the optical component housing 36 is constituted by outer side surfaces 361, 362 of the optical component housing 36, a dichroic mirror 331, and the relay lens 337 (see FIG. 7). Using such a configuration, in the second closed housing 7, there is formed a circulation flow path having an annular shape. Specifically, as shown in FIG. 4, the second cooling object (the polarization conversion element 325) described above is disposed on the circulation flow path.

The circulation fan 612 corresponds to a second circulation fan according to the invention, and suctions and then ejects the cooling air located inside the second closed housing 7 to thereby circulate the cooling air inside the second closed housing 7. The circulation fan 612 is formed of a sirocco fan in the present embodiment, and is disposed in the vicinity of the heat absorber 621 described later. However, besides this configuration, it is possible for the circulation fan 612 to be formed of an axial fan, and the number of the circulation fans 612 can arbitrarily be changed, and further, the circulation fans 612 can be arranged in a dispersed manner.

Configuration of Heat Absorbing Device and Heat Radiation Device

The heat absorbing device 62 is for absorbing the heat from the cooling air located inside the second closed housing 7 described above, and circulating the third liquid, to which the heat has been conducted, to the heat radiation device 63 located outside the second closed housing 7. The heat absorbing device 62 has the heat absorber 621 and the heat pipe 622. It should be noted that the heat absorber 621 corresponds to a second cooler according to the invention.

Among these constituents, the heat pipe 622 is provided with a flow path, through which the third liquid circulates, located inside. To the heat pipe 622, there is connected the heatsink 631 as the heat radiation device 63, and by the cooling air supplied to the heatsink 631, the heat pipe 622 connected to the heatsink 631 is cooled. Thus, the heat having been absorbed by the heat absorber 621 is released from the inside of the second closed housing 7.

In such a manner, in the second circulatory cooling device 6, the polarization conversion element 325 as the second cooling object described above is cooled in the circulation flow path while the cooling air is cooled by the heat absorber 621.

Configuration of Optical Component Housing

Figure 7:
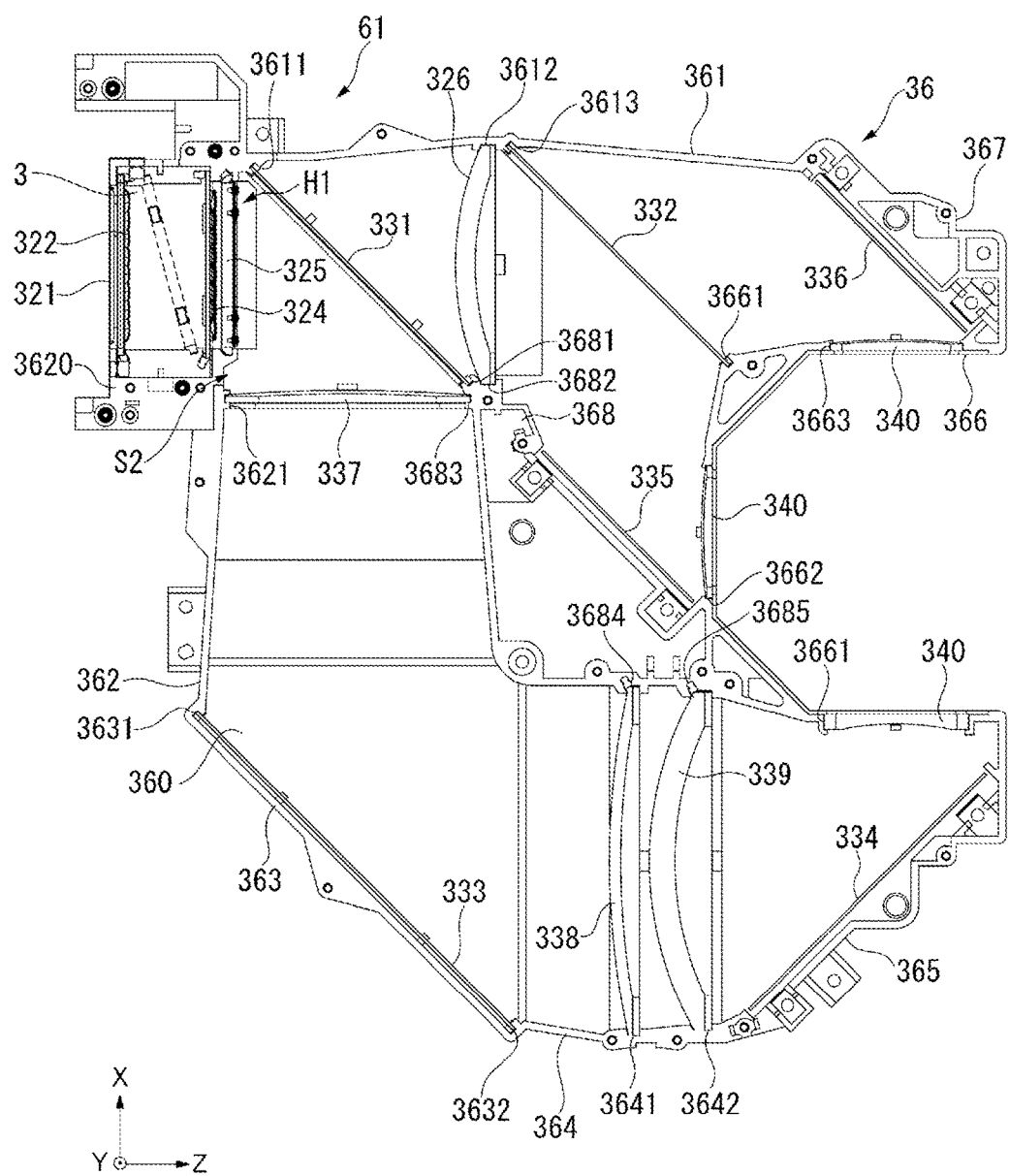
FIG. 7 is a plan view of the optical component housing of the projector according to the first embodiment.
Figure 8:
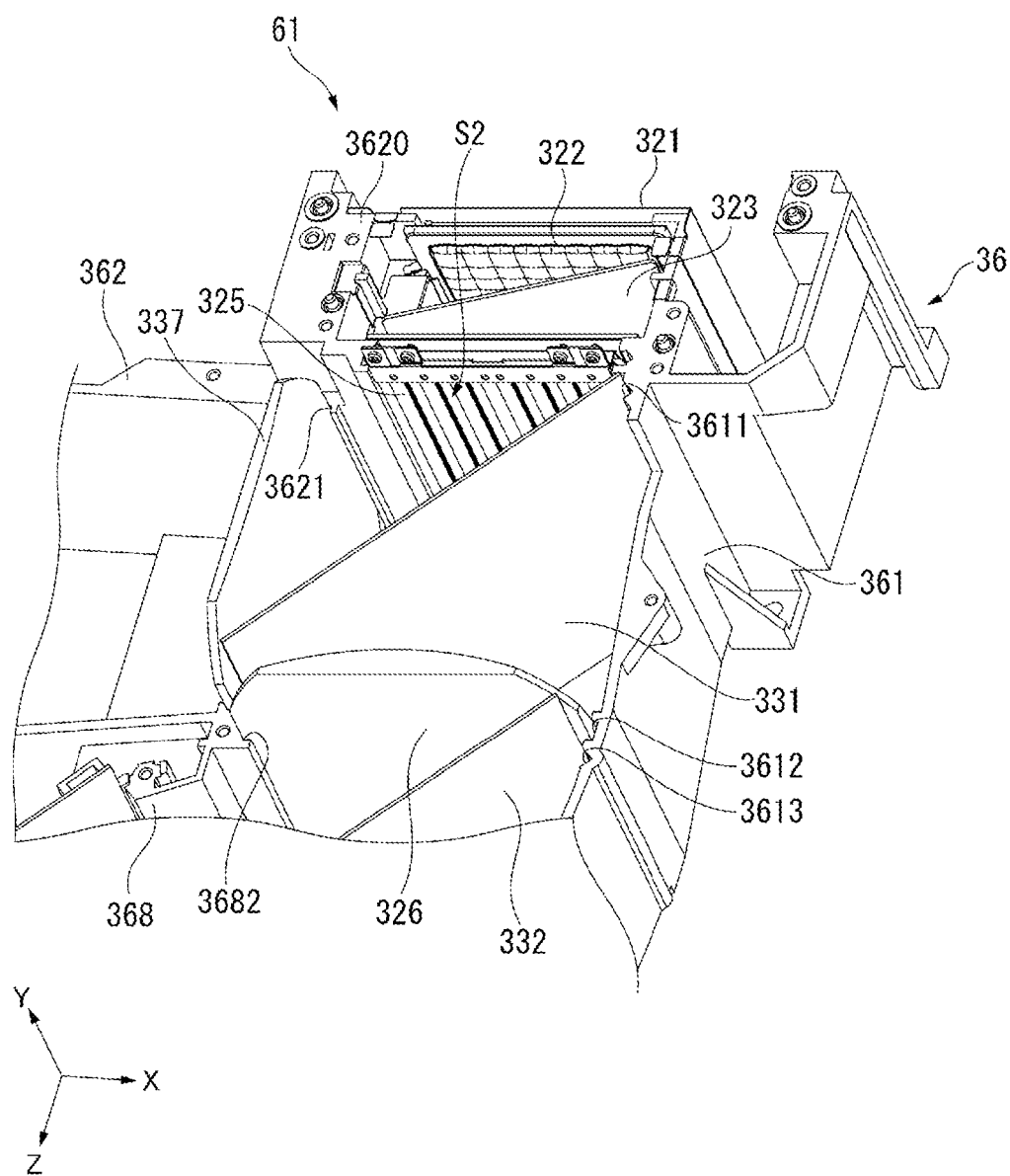
FIG. 8 is a perspective view showing a part of the optical component housing of the projector according to the first embodiment in an enlarged manner.

FIG. 7 is a plan view of the optical component housing 36 of the projector 1 viewed from the Y-direction side, FIG. 8 is a perspective view showing a part of the optical component housing 36 in an enlarged manner. It should be noted that the optical component housing 36 shown in FIGS. 7 and 8 is in the state in which the top surface section 369 is removed.

The optical component housing 36 is provided, as shown in FIGS. 7 and 8, with a bottom surface section 360, outer surface sections 361 through 367, inner surface section 368, and a top surface section 369 (see FIG. 5).

The bottom surface section 360 is formed to have a roughly U shape. From each of outer edges located on the outer side of the bottom surface section 360, there are disposed the outer surface sections 361 through 367 extending toward the Y direction. Further, in a central portion of the bottom surface section 360, there is disposed the inner surface section 368 having a roughly triangular shape extending toward the Y direction. The bottom surface section 360, the outer surface sections 361 through 367, and the inner surface section 368 are formed integrally. However, the invention is not limited to this configuration, but the bottom surface section 360, the outer surface sections 361 through 367, and the inner surface section 368 can also be formed as separated members.

Further, a part of the bottom surface section 360 corresponding to a position where the polarization conversion element 325 is disposed is provided with an opening section H1.

The outer surface section 361 is a side surface section located on the most X-direction side when viewing the optical component housing 36 from the Y-direction side. The end portion on the opposite-direction side to the Z-direction side of the outer surface section 361 is connected to the outer surface section 362, and the end portion on the Z-direction side is connected to the outer surface section 367. The outer surface section 361 is provided with groove sections 3611, 3612, and 3613. Further, at the positions opposed to the groove sections 3611, 3612 of the inner surface section 368, there are formed groove sections 3681, 3682. Further, at the position opposed to the groove section 3613 of the outer surface section 366, there is formed a groove section 3661. The dichroic mirror 331 described above is fitted into the groove sections 3611, 3681 from the Y-direction side. Further, the overlapping lens 326 is fitted into the groove sections 3612, 3682 from the Y-direction side. Further, the dichroic mirror 332 is fitted into the groove sections 3613, 3661 from the Y-direction side. Thus, the dichroic mirrors 331, 332 and the overlapping lens 326 are firmly fixed to the optical component housing 36.

Among these constituents, the dichroic mirror 331 is fixed to the optical component housing 36 to thereby form a division wall according to the invention together with the optical component housing 36. In other words, the dichroic mirror 331 constitutes a part of the second closed housing 7 of the second circulatory cooling device 6. It should be noted that the dichroic mirror 331 corresponds to a second optical component and a reflecting member according to the invention.

The outer surface section 362 is a side surface section located on the most opposite-direction side to the Z-direction side when viewing the optical component housing 36 from the Y-direction side. The end portion on the X-direction side of the outer surface section 362 is connected to the outer surface section 361 as described above, and the end portion on the opposite direction side to the X-direction side is connected to the outer surface section 363. The outer surface section 362 has a projection section 3620 projecting toward an opposite direction to the Z direction. As shown in FIGS. 7 and 8, in the projection section 3620, there are disposed the cinema filter 321, the first lens array 322, the UV filter 323, the second lens array 324, and the polarization conversion element 325. The first lens array 322 corresponds to the second optical component and a lens according to the invention.

Further, the outer surface section 362 is provided with a groove section 3621. Further, at the position opposed to the groove section 3621 of the inner surface section 368, there is formed a groove section 3683. The relay lens 337 described above is fitted into the groove sections 3621, 3683 from the Y-direction side. Thus, the relay lens 337 is fixed to the optical component housing 36 to thereby form the division wall according to the invention together with the optical component housing 36. In other words, the relay lens 337 constitutes apart of the second closed housing 7 of the second circulatory cooling device 6. It should be noted that the relay lens 337 corresponds to the second optical component and the lens according to the invention.

The outer surface section 363 is a side surface section located on the most opposite-direction side to the X-direction side, and on the most opposite-direction side to the Z-direction side when viewing the optical component housing 36 from the Y-direction side. The end portion on the X-direction side of the outer surface section 363 is connected to the outer surface section 362 as described above, and the end portion on the opposite-direction side to the X-direction side is connected to the outer surface section 364. Both of the end portions of outer surface section 363 are respectively provided with the groove sections 3631, 3632, and the reflecting mirror 333 is fitted into the groove sections 3631, 3632 from the Y-direction side. Thus, the reflecting mirror 333 is firmly fixed to the optical component housing 36.

The outer surface section 364 is a side surface section located on the most opposite-direction side to the X-direction side, and opposed to the outer surface section 361 when viewing the optical component housing 36 from the Y-direction side. The end portion on the opposite-direction side to the Z-direction side of the outer surface section 364 is connected to the outer surface section 363 as described above, and the end portion on the Z-direction side is connected to the outer surface section 365. The outer surface section 364 is provided with groove sections 3641, 3642. Further, at the positions opposed to the groove sections 3641, 3642 of the inner surface section 368, there are formed groove sections 3684, 3685. The relay lens 338 is fitted into the groove sections 3641, 3684 from the Y-direction side, and the relay lens 339 is fitted into the groove sections 3642, 3685 from the Y-direction side. Thus, the relay lenses 338, 339 are firmly fixed to the optical component housing 36.

The outer surface section 365 is a side surface section located on the opposite-direction side to the X-direction side, and on the most Z-direction side when viewing the optical component housing 36 from the Y-direction side. The end portion on the opposite-direction side to the Z-direction side of the outer surface section 365 is connected to the outer surface section 364 as described above, and the end portion on the Z-direction side is connected to the outer surface section 366. The reflecting mirror 334 is fixed to the outer surface section 365.

The outer surface section 366 is a side surface section having a U shape, and located on the most Z-direction side when viewing the optical component housing 36 from the Y-direction side. The end portion on the opposite-direction side to the X-direction side of the outer surface section 366 is connected to the outer surface section 365 as described above, and the end portion on the X-direction side is connected to the outer surface section 367. The reflecting mirror 334 is fixed to the outer surface section 365.

Further, the outer surface section 366 is provided with pairs of groove sections 3661, 3662, and 3663, and the field lenses 340 are fitted into the pairs of groove sections 3661, 3662, and 3663 from the Y-direction side to be fixed to the pairs of groove sections 3661, 3662, and 3663, respectively.

The outer surface section 367 is a side surface section located on the most X-Z-direction side when viewing the optical component housing 36 from the Y-direction side, and is disposed at a position opposed to the outer surface side 363 described above. The end portion on the opposite-direction side to the Z-direction side of the outer surface section 367 is connected to the outer surface section 361 as described above, and the end portion on the Z-direction side is connected to the outer surface section 366. The reflecting mirror 336 is fixed to the outer surface section 367.

Further, to the surface on the X-Z-direction side of the inner surface section 368, there is fixed the reflecting mirror 335.

Enclosed Space in Optical Component Housing

As described above, the bottom surface section 360 is provided with the opening section H1, and the dichroic mirror 331 and relay lens 337 are fixed to the optical component housing 36 so as to surround the opening section H1. Thus, the second cooling air having circulated from the opening section H1 circulates in a space surrounded by the projection section 3620, the first lens array 322, and the dichroic mirror 331 and the relay lens 337 in the optical component housing 36, namely in the closed space S2.

It should be noted that the top surface section 369 is provided with an opening section H2 (see FIG. 9) disposed on the Y-direction side of the polarization conversion element 325. Further, the opening sections H1, H2 are formed to have roughly the same shapes as each other.

Circulation Flow Path of Cooling Device

Figure 9:
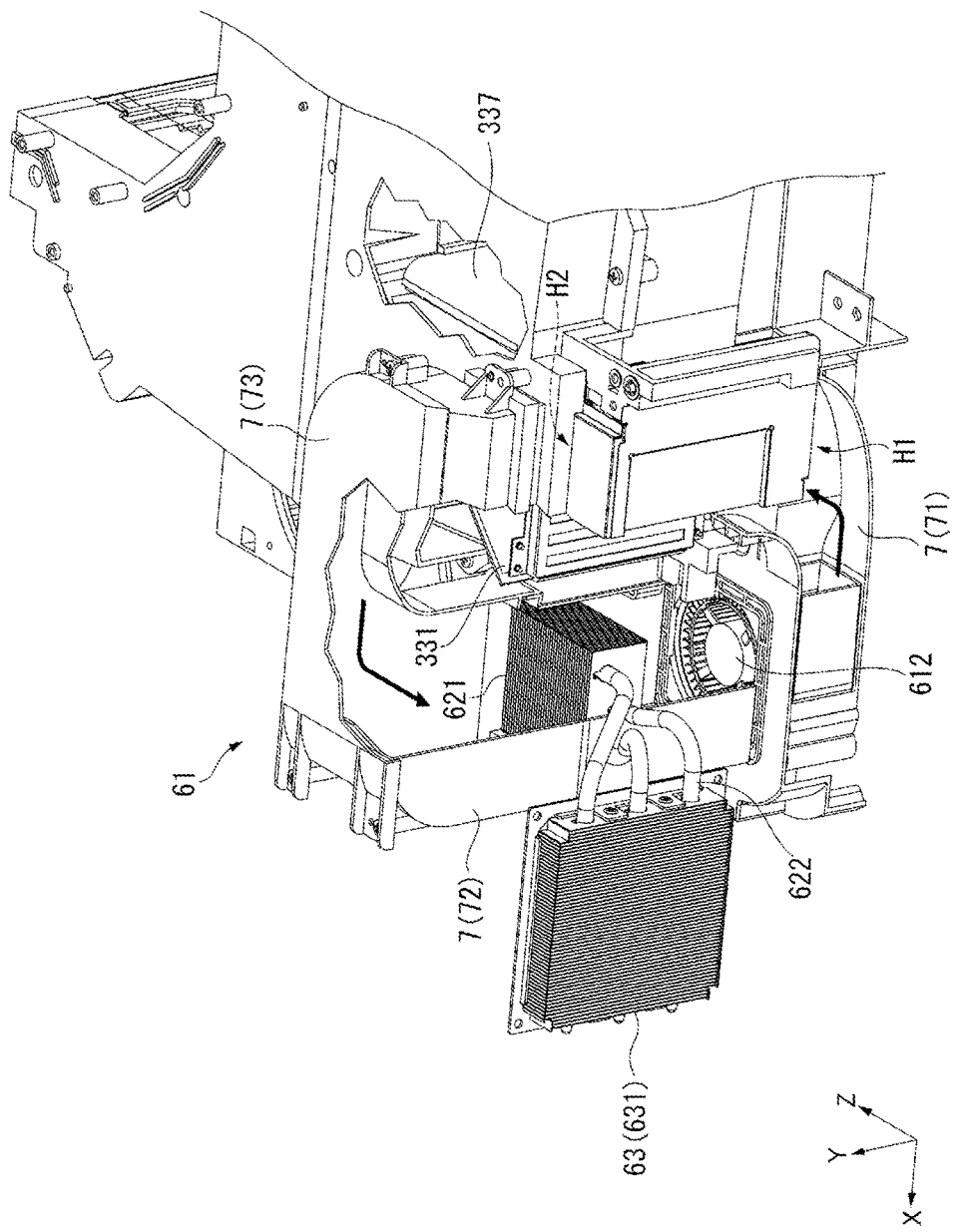
FIG. 9 is a cross-sectional perspective view of the second circulatory cooling device of the projector according to the first embodiment viewed from the opposite side to the light emission direction.
Figure 10:
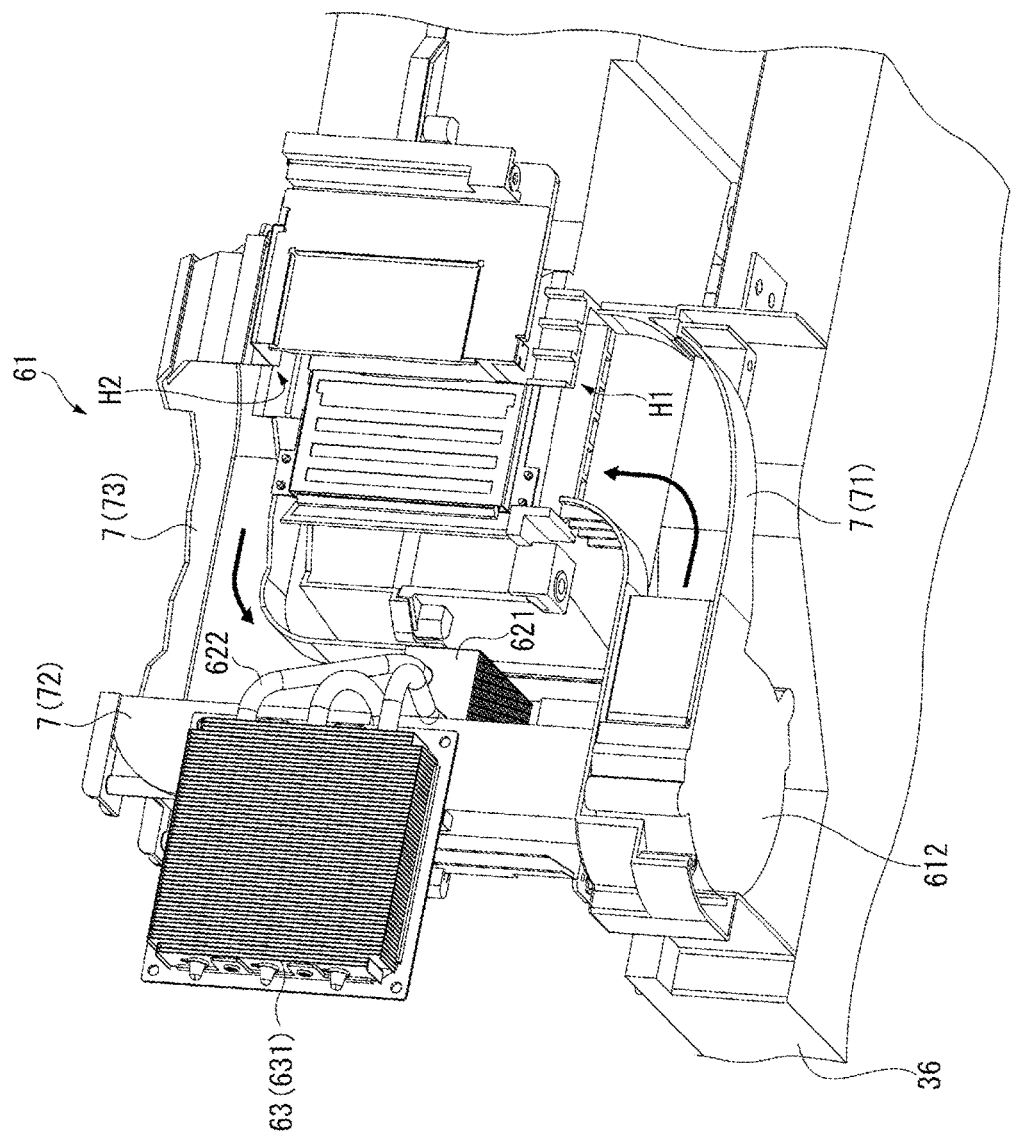
FIG. 10 is a cross-sectional perspective view of the second circulatory cooling device of the projector according to the first embodiment viewed from a direction angle from the angle in FIG. 9.

FIG. 9 is a cross-sectional perspective view of the second circulatory cooling device 6 viewed from the opposite side to the light emission direction, and FIG. 10 is a cross-sectional perspective view of the second circulatory cooling device 6 viewed from a different angle from that in FIG. 9.

As shown in FIGS. 9 and 10, the second closed housing 7 of the cooling device 61 is provided with a first duct 71, a second duct 72, and a third duct 73. One of the end portions of the first duct 71 is connected to the opening section H1 of the bottom surface section 360. Further, the other of the end portions of the first duct 71 is connected to the circulation fan 612.

One of the end portions of the second duct 72 is connected to a suction port of the circulation fan 612. Further, the other of the end portions of the second duct 72 is connected to an end portion of the third duct 73. As described above, the heat absorber 621 is disposed in the second duct 72, and the second cooling air circulating through the second duct 72 is cooled by the heat absorber 621.

One of the end portions of the third duct 73 is connected to the second duct 72, and the other of the end portions is connected to the opening section H2 provided to the top surface section 369. Further, as described above, the dichroic mirror 331 and the relay lens 337 disposed in the optical component housing 36 constitute a part of the second closed housing 7.

According to such a configuration, the ducts 71 through 73, the first lens array 322, the dichroic mirror 331, the relay lens 337, and the optical component housing 36 form the closed space S2. Further, due to the drive of the circulation fan 612, the second cooling air circulates in the closed space S2 as shown in FIG. 4. Therefore, the polarization conversion element 325 as the second cooling object is cooled.

The projector 1 according to the present embodiment described hereinabove exerts the following advantages.

Since the electro-optic device 34 as the first cooling object and the polarization conversion element 325 as the second cooling object are respectively cooled by the first circulatory cooling device 5 and the second circulatory cooling device 6 separated from each other, it is possible to appropriately cool each of the first cooling object and the second cooling object, and control the first cooling object and the second cooling object at an appropriate temperature.

Here, in the case in which the first cooling object and the second cooling object are respectively disposed at positions distant from each other, if the first and second cooling objects are cooled with a single circulatory cooling device, the circulatory cooling device grows in size. In contrast, according to the present embodiment, the first circulatory cooling device 5 and the second circulatory cooling device 6 can be downsized compared to the case of cooling the first cooling object (the electro-optic device 34) and the second cooling object (the polarization conversion element 325) with the single circulatory cooling device. Further, by separately disposing the first circulatory cooling device 5 and the second circulatory cooling device 6, the freedom of arrangement of the first circulatory cooling device 5 and the second circulatory cooling device 6 in the projector 1 can be enhanced. Therefore, the projector 1 can be downsized.

Since the polarization conversion element 325 can individually be cooled by the second circulatory cooling device 6, the temperature of each of the electro-optic device 34 and the polarization conversion element 325 can more appropriately be managed.

Since the division walls constituting the second closed housing 7 are constituted by the optical component housing 36, the dichroic mirror 331, and the relay lens 337, the number of parts can be reduced, and at the same time, downsizing can be achieved compared to the case of constituting the second closed housing 7 only by other parts. Further, since the first closed housing 511 and the second closed housing 7 are separated from each other by the optical component housing 36, the dichroic mirror 331, and the relay lens 337, the electro-optic device 34 and the polarization conversion element 325 can surely be cooled, and can be controlled at an appropriate temperature.

Since the dichroic mirror 331 constitutes a part of the division wall (the second closed housing 7), the second closed housing 7 can surely be constituted by the dichroic mirror 331.

Further, since the relay lens 337 constitutes a part of the division wall (the second closed housing 7), the first closed housing 511 and the second closed housing 7 can surely be constituted by the relay lens 337.

The first cooling air and the second cooling air circulating in the first closed housing 511 and the second closed housing 7 can be cooled by the heat absorber 521 and the heat absorber 621, respectively. Therefore, the electro-optic device 34 and the polarization conversion element 325 can surely be cooled by the first cooling air and the second cooling air, respectively.

Second Embodiment

Then, a second embodiment of the invention will be described.

A projector according to the present embodiment is provided with substantially the same configuration as that of the projector 1 described above, but is different in the cooling object to be cooled by the cooling device 61 of the second circulatory cooling device 6. Specifically, the present embodiment is different from the first embodiment described above in the point that a phosphor wheel is adopted as the second cooling object instead of the polarization conversion element 325. It should be noted that in the description below, a part which is the same or substantially the same as the part having already been described is denoted by the same reference symbol, and the description thereof will be omitted.

Figure 11:
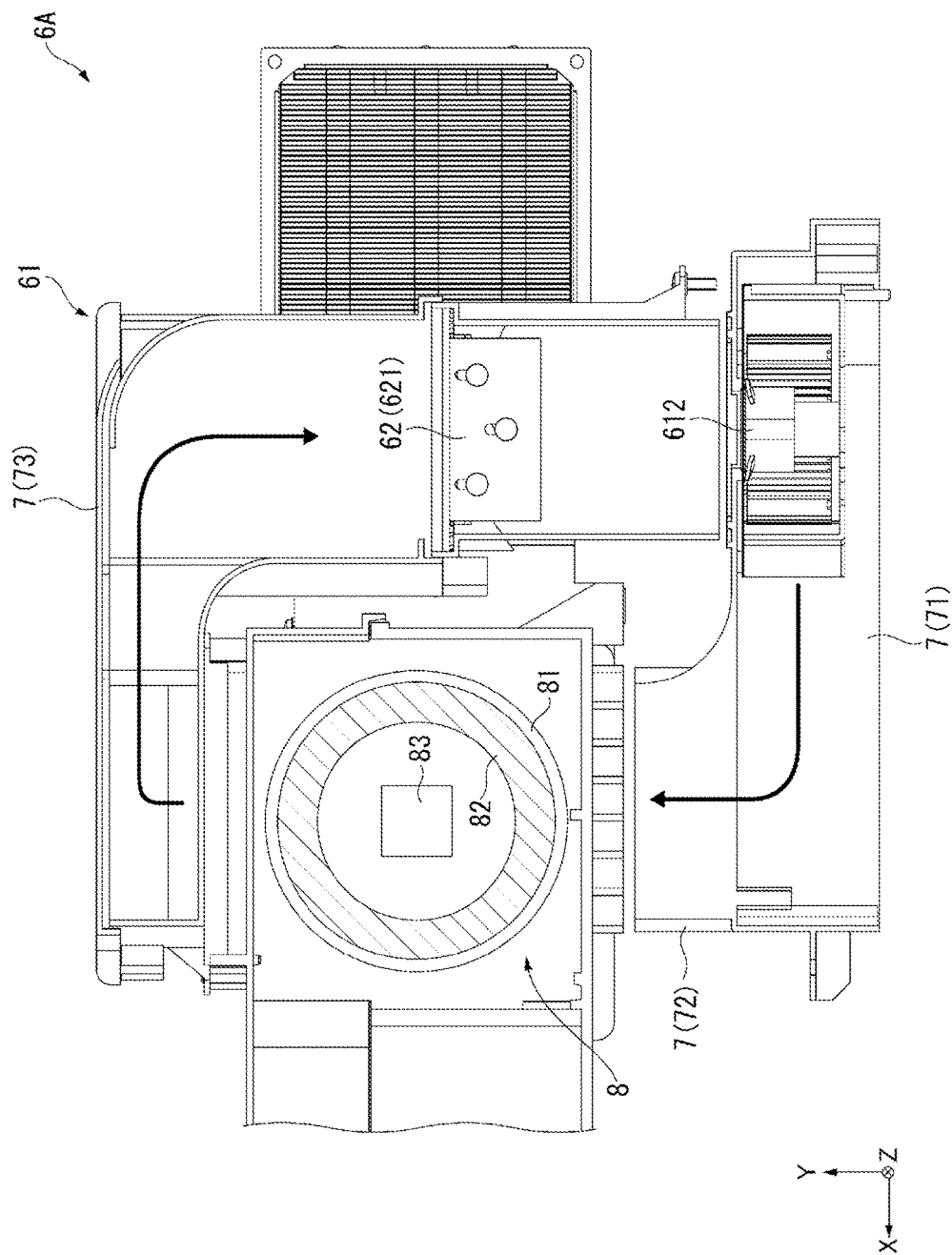
FIG. 11 is a cross-sectional view showing cooling objects and a flow path of a second circularly cooling device of a projector according to a second embodiment of the invention.

FIG. 11 is a schematic diagram showing the circulation flow path and the cooling object of the second cooling air in the cooling device 61 according to the present embodiment.

The cooling device 61 constituting the second circulatory cooling device 6A according to the present embodiment circulates the second cooling air in the second closed housing 7 to thereby cool the phosphor wheel 8. Therefore, in the present embodiment, a solid-state laser source (not shown) is used as the light source instead of the light source device 31A and the light source device 31B.

The phosphor wheel 8 is provided with a substrate 81, a wavelength conversion layer 82, and an electric motor 83. The substrate 81 is formed to have a disk-like shape viewed from the Z-direction side, and is constituted by a member having a light transmissive property. Further, on the surface on the Z-direction side of the substrate 81 having the disk-like shape, there is formed the wavelength conversion layer 82 having a doughnut shape. The wavelength conversion layer 82 has a function of being excited by the excitation light having entered the wavelength conversion layer, and emitting fluorescent light (yellow light) converted from the excitation light. In other words, the wavelength conversion layer 82 includes phosphor excited by the excitation light described above.

Further, to a roughly central part of the substrate 81, there is connected the electric motor 83, and it is arranged that the substrate 81 rotates by the drive of the electric motor 83.

In the cooling device 61 of the second circulatory cooling device 6A, when the circulation fan 612 is driven, the second cooling air circulates in the second closed housing 7 as shown in FIG. 11. Further, since the second cooling air circulates through the substrate 81 rotating due to the drive of the electric motor 83 toward the Y direction, the phosphor wheel 8 can efficiently be cooled.

According to the projector related to the present embodiment described hereinabove, the following advantages are exerted in addition to the advantages of the projector 1 according to the first embodiment.

The phosphor wheel 8 (the wavelength conversion layer 82) can individually be cooled by the second circulatory cooling device 6. Thus, the temperature of each of the electro-optic device 34 and the phosphor wheel 8 can be controlled at more appropriate temperature.

Modifications of Embodiments

The invention is not limited to each of the embodiments described above, but includes modifications, improvements, and so on in the range where the advantages of the invention can be achieved.

In each of the embodiments described above, it is assumed that the polarization conversion element 325 and the phosphor wheel 8 are cooled by the second circulatory cooling device 6. However, the invention is not limited to this configuration. For example, it is also possible to assume that the first lens array 322 or the second lens array 324 is cooled as the cooling object. In other words, the second cooling object to be cooled by the second circulatory cooling device 6 can be any optical component as long as the second cooling object is an optical component.

In each of the embodiments described above, it is assumed that the first cooling air and the second cooling air are circulated for cooling the first cooling object and the second cooling object, respectively. However, the invention is not limited to this configuration. It is also possible to cool each of the cooling objects by circulating a gas other than air.

In each of the embodiments described above, it is assumed that the first closed housing 511 is separated by the outer surface section 367 of the optical component housing 36, and the second closed housing 7 is separated by the optical component housing 36, the dichroic mirror 331, and the relay lens 337. However, the invention is not limited to this configuration. It is not required for a part of the first closed housing 511 and a part of the second closed housing 7 to be constituted by the optical component housing 36, or by the optical component housing 36, the dichroic mirror 331, and the relay lens 337. For example, it is not required for the second closed housing 7 to be provided with the relay lens 337. In this case, the relay lens 338 functions as the division wall described above.

In each of the embodiments described above, it is assumed that the cooling device 51 of the first circulatory cooling device 5 is provided with the heat absorber 521, and the cooling device 61 of the second circulatory cooling device 6 is provided with the heat absorber 621. However, the invention is not limited to this configuration. For example, it is not required to provide the heat absorbers 521, 621. In this case, it is also possible to, for example, separately provide a cooling section for cooling each of the first closed housing 511 and the second closed housing 7.

In the second embodiment described above, it is assumed that the substrate 81 of the phosphor wheel 8 rotates due to the drive by the electric motor 83. However, the invention is not limited to this configuration. It is also possible to arrange that, for example, a fin or the like, with which the second cooling air circulating in the second closed housing 7 described above collides, is disposed on a surface on the opposite-direction side to the Z-direction side of the substrate 81. According to this configuration, since the substrate 81 described above is rotated by the second cooling air described above, it is possible to cool the phosphor wheel 8 without providing the electric motor 83.

In each of the embodiments described above, it is assumed that the transmissive liquid crystal panels 341 (341R, 341G, and 341B) are used as the light modulation device. However, the invention is not limited to this configuration. It is also possible to use, for example, reflective liquid crystal panels instead of the transmissive liquid crystal panels 341 (341R, 341G, and 341B). In this case, it is also possible to perform color separation and color composition using the color combining device 344 without providing the color separation device 33.

In each of the embodiments described above, it is assumed that the projector 1 is equipped with the three liquid crystal panels 341 (341R, 341G, and 341B), but the invention is not limited to this configuration. Specifically, the invention can also be applied to a projector using two or less liquid crystal panels, or four or more liquid crystal panels.

Further, it is also possible to use a digital micromirror device or the like instead of the liquid crystal panels.

In the first embodiment described above, it is assumed that the projector 1 is provided with the pair of light source devices 31A, 31B. However, the invention is not limited to this configuration. For example, the number of the light source devices can be one, or four.

In each of the embodiments described above, the image forming device 3 is configured to have a roughly U shape, but the invention is not limited to this configuration. For example, it is also possible to adopt an image forming device configured to have a roughly L shape.

CROSS REFERENCE TO RELATED APPLICATIONS

This application claims priority to Japanese Patent Application No. 2015-079016 filed on Apr. 8, 2015, the entire contents of which are incorporated by reference herein.

What is claimed is:

1. A projector comprising:
a first cooling object and a second cooling object;
a first circulatory cooling device having a first closed housing and adapted to circulate a first cooling gas in the first closed housing to cool the first cooling object disposed in the first closed housing, the first circulatory cooling device including:
a first circulation fan adapted to circulate the first cooling gas in the first closed housing, and
a first cooler adapted to cool the first cooling gas circulated, and
a second circulatory cooling device having a second closed housing and adapted to circulate a second cooling gas in the second closed housing to cool the second cooling object disposed in the second closed housing, the second circulatory cooling device including:
a second circulation fan adapted to circulate the second cooling gas in the second closed housing, and
a second cooler adapted to cool the second cooling gas circulated,
wherein
the first cooling object is an image forming section including a light modulation device adapted to modulate light entering the light modulation device to form an image, and
the second cooling object is a first optical component included in an optical component making a contribution to the formation of the image by the light modulation device.

2. The projector according to claim 1, wherein the first optical component is a polarization conversion element.

3. The projector according to claim 1, wherein the first optical component is a wavelength conversion element to be excited by excitation light entering the wavelength conversion element and adapted to emit fluorescent light.

4. The projector according to claim 1, wherein the first closed housing and the second closed housing are separated by a division wall, and
the division wall is constituted by an optical component housing adapted to hold the optical component, and a second optical component included in the optical component.

5. The projector according to claim 4, wherein the second optical component includes a reflecting member adapted to reflect light entering the second optical component.

6. The projector according to claim 5, wherein the second optical component includes a lens.

* * * * *